US008316215B2

United States Patent
Hoshi

(10) Patent No.: US 8,316,215 B2
(45) Date of Patent: Nov. 20, 2012

(54) VECTOR PROCESSOR WITH PLURAL ARITHMETIC UNITS FOR PROCESSING A VECTOR DATA STRING DIVIDED INTO PLURAL REGISTER BANKS ACCESSED BY READ POINTERS STARTING AT DIFFERENT POSITIONS

(75) Inventor: Noritaka Hoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 12/529,892

(22) PCT Filed: Mar. 7, 2008

(86) PCT No.: PCT/JP2008/054124
§ 371 (c)(1),
(2), (4) Date: Sep. 3, 2009

(87) PCT Pub. No.: WO2008/111500
PCT Pub. Date: Sep. 18, 2008

(65) Prior Publication Data
US 2010/0064115 A1    Mar. 11, 2010

(30) Foreign Application Priority Data
Mar. 8, 2007   (JP) ................................. 2007-058560

(51) Int. Cl.
*G06F 15/80* (2006.01)
(52) U.S. Cl. .............................................. 712/7; 712/4
(58) Field of Classification Search .................. None
See application file for complete search history.

(56) References Cited

U.S. PATENT DOCUMENTS

| | | | | |
|---|---|---|---|---|
| 4,641,275 A * | 2/1987 | Hatakeyama et al. | ............ | 712/9 |
| 4,712,175 A * | 12/1987 | Torii et al. | .......................... | 712/4 |
| 5,513,366 A * | 4/1996 | Agarwal et al. | ................. | 712/22 |
| 7,447,873 B1 * | 11/2008 | Nordquist | ....................... | 712/22 |
| 7,797,363 B2 * | 9/2010 | Hokenek et al. | .............. | 708/603 |
| 8,122,227 B2 * | 2/2012 | Van Wel | .......................... | 712/22 |

FOREIGN PATENT DOCUMENTS

| | | |
|---|---|---|
| JP | 6-103491 A | 12/1994 |
| JP | 2547219 B | 8/1996 |
| JP | 11-353305 A | 12/1999 |
| JP | 2001167084 A | 6/2001 |
| JP | 2005038185 A | 2/2005 |

OTHER PUBLICATIONS

International Search Report for PCT/JP2008/054124 mailed Jun. 10, 2008.
S. Fernbach, Translated by S. Nagashima, "Supercomputers", Personal Media Corporation, Apr. 1, 1988, pp. 212-215.

* cited by examiner

*Primary Examiner* — Kenneth Kim

(57) ABSTRACT

It is an object to speed up a vector store instruction on a memory that is divided into banks as setting a plurality of elements as a unit while minimizing an increase in physical quantity. A vector processing apparatus has a plurality of register banks and processes a data string including a plurality of data elements retained in the plurality of register banks, wherein: the plurality of register banks each have a read pointer 113 that points to a read position for reading the data elements; and the start position of the read pointer 113 is changed from one register bank to another. For example, consecutive numbers assigned to the register banks may be used as the read start positions of the respective register banks.

7 Claims, 9 Drawing Sheets

“VECTOR PROCESSOR WITH PLURAL ARITHMETIC UNITS FOR PROCESSING A VECTOR DATA STRING DIVIDED INTO PLURAL REGISTER BANKS ACCESSED BY READ POINTERS STARTING AT DIFFERENT POSITIONS”

TECHNICAL FIELD

The present invention relates to a vector processing apparatus and more particularly, to a vector processing apparatus by which a vector store instruction is performed at higher speed on a memory that is divided into banks as setting a plurality of elements as a unit. This application is the National Phase of PCT/JP2008/054124, filed Mar. 7, 2008, which is based upon and claims the benefit of priority from prior Japanese Patent Application No. 2007-058560, filed on Mar. 8, 2007. The contents of Japanese Patent Application No. 2007-058560 are incorporated herein.

BACKGROUND ART

A vector computer has a plurality of vector pipelines for processing a plurality of pieces of data simultaneously at each machine clock.

The plurality of vector pipelines divide a single vector arithmetic instruction into the respective vector pipelines for processing.

For example, page 214 of Non-Patent Document 1 depicts parallel pipelines and multiple parallel pipelines.

When a single vector arithmetic instruction is divided and executed in a plurality of vector pipelines, both input and output vectors are also divided into the respective vector pipelines for data exchange.

In order to uniformize the processing time of each vector pipeline, the data string is interleaved element by element and retained in a vector register even when the number of elements (vector length) of the vector register is small.

That a plurality of pieces of data are simultaneously processed at each machine clock applies not only to vector arithmetic instructions but also to main memory access instructions.

Various techniques may be used to exchange a plurality of pieces of data between a central processing unit and a main memory device at each machine clock, whereas a plurality of interfaces to the main memory device called ports are generally provided to the central processing.

The plurality of ports can be simultaneously operated in a single machine clock, which makes it possible to transfer a plurality of pieces of data to the main memory device or receive a plurality of pieces of data from the main memory device at every machine clock.

Here, the main memory device has data storing sections that are divided port by port.

The data storing sections and the ports correspond to each other in a one-to-one relationship. If a main memory address to be accessed is specified, the data storing section and port to be accessed are determined uniquely.

The main memory device of the vector computer generally stores data as interleaved as setting a data element as a unit.

Such a design is intended to perform data transfer at maximum speed when a plurality of vector pipelines simultaneously access a plurality of pieces of data that are stored in consecutive addresses.

A configuration example of a vector processor with such a plurality of vector pipelines and a plurality of ports is described, for example, in Patent Document 1.

Now, FIG. 1 shows a configuration example of a vector processing apparatus of the background art.

A central processing unit 101 includes an instruction issuance control section 102, a vector processing section 103, an address calculating section 104, and CPU input/output ports 105.

The CPU input/output ports 105 are connected to main memory input/output ports 107 of a main memory device 106, respectively.

The main memory input/output ports 107 are connected to main memory data storing sections 108, respectively. The main memory data storing sections 108 have a multibank configuration as setting a data element as a unit.

The vector processing section 103 includes a plurality of vector pipelines 109 and a crossbar 110.

Each vector pipeline 109 includes a vector arithmetic section 111 and a register bank (any one of register banks 112-0 to 112-7 in FIG. 1). The whole of the register banks 112-0 to 112-7 is a single vector register. The vector register is divided into a plurality of banks to constitute the respective register banks 112-0 to 112-7.

Each of the register banks 112-0 to 112-7 has a read pointer 113. The crossbar 110 can connect the inputs and outputs of the plurality of vector pipelines 109 and the plurality of CPU input/output ports 105 in any combination.

Each of the register banks 112-0 to 112-7 is divided into a plurality of vector pipelines.

In the present example, the vector register retains 256 elements, which are divided into eight vector pipelines.

The division is element by element such that the element 0 is on the register bank 112-0, the element 1 is on the register bank 112-1, . . . , the element 7 is on the register bank 112-7, the element 8 is on the register bank 112-0, and so on.

When the vector processing section 103 receives a vector instruction from the instruction issuance control section 102, the vector processing section 103 activates the vector register's register bank(s) that is/are designated in the instruction word.

Each of the register banks 112-0 to 112-7 exchanges data with each CPU input/output port 105 through the crossbar 110.

When the address calculating section 104 receives a main memory access instruction such as a vector load instruction and a vector store instruction from the instruction issuance control section 102, the address calculating section 104 calculates main memory addresses according to the designation of the instruction word.

In order for the vector pipelines 109 to access the main memory device 106 independently, the address calculating section 104 is configured so that it can calculate main memory addresses as many as the number of vector pipelines in a single machine clock.

The central processing unit 101 has a plurality of CPU input/output ports 105, and the main memory device 106 is divided into the same number as the number of CPU input/output ports.

In the present example, the central processing unit 101 has thirty-two CPU input/output ports 105-0 to 105-31, and the main memory device 106 is divided in thirty-two sections.

The CPU input/output ports 105-0 to 105-31 are connected to the main memory input/output ports 107-0 to 107-31 in a one-to-one relationship, respectively. The main memory input/output ports 107-0 to 107-31 are connected to the main memory data storing sections 108-0 to 108-31 in a one-to-one relationship; respectively.

The CPU input/output ports 105 and the main memory input/output ports 107 are operable with the same machine clock.

The main memory data storing sections 108 are divided into banks as setting an element as a unit.

For example, the main memory data storing section 108-0 shall contains the element 0, and the main memory data storing section 108-1 contains the element 1.

Next, an example of the configuration and operation of the address calculating section 104 will be described with reference to FIG. 2.

A start address is given from the instruction issuance control section 102 through a signal line 601, and is recorded into a start address retaining section 602.

The value of the start address retaining section 602 is passed to eight address calculating circuits 608, which calculate addresses corresponding to the outputs from the eight vector pipelines 109, respectively.

A pipeline offset 603 retains the product of each pipeline number and the stride value of the vector store instruction.

An adder 604 calculates the sum of the start address and the pipeline offset 603 to determine the address of the top element of the register bank. The address is transmitted to the crossbar 110 through an address signal line 607.

The address calculated is input to an adder 606. The value of an offset 605 is added to the address, and the address which the value of an offset 605 is added is output again at the next machine clock. The value of the offset 605 is the product of the stride value of the vector store instruction and the number of pipelines.

By adding such a value, the address value of the next element in the register bank 112-$n$ (here, "n" indicates one of numbers from 0 to 7) can be calculated.

Next, specific description will be given of the operation of the vector store instruction in the vector processing apparatus of the background art.

When a vector store instruction is given, the instruction issuance control section 102 activates the vector processing section 103 and the address calculating section 104.

Each vector pipeline 109 of the vector processing section 103 reads the element that the read pointer 113 of the designated register bank points to, and sends the element to the crossbar 110.

The value of the read pointer 113 which indicates the read position points to the top element initially, and is controlled to point to the next element after a read.

That is, at the first machine clock, the element 0 is output from the register bank 112-0, the element 1 is output from the register bank 112-1, and so on. At the next machine clock, the element 8 is output from the register bank 112-0, the element 9 is output from the register bank 112-1, and so on.

Meanwhile, the address calculating section 104 calculates the write addresses of the data output from the respective vector pipelines 109.

The address calculating section 104 can calculate addresses as many as the number of vector pipelines 109 in a single machine clock.

Consequently, all the outputs from the vector pipelines 109 are simultaneously input to the crossbar 110.

In the present example, the elements 0, 1, 2, . . . on the register banks 112-0 to 112-7 shall be stored at addresses 0, 1, 2, . . . on the main memory data storing sections 108.

The data input to the crossbar 110 is transmitted through the CPU input/output ports 105 and main memory input/output ports 107 to the main memory data storing sections 108, and written to the main memory. If a conflict occurs here at any output port of the crossbar 110, the data to be output wait in the crossbar 110.

Figure 3:
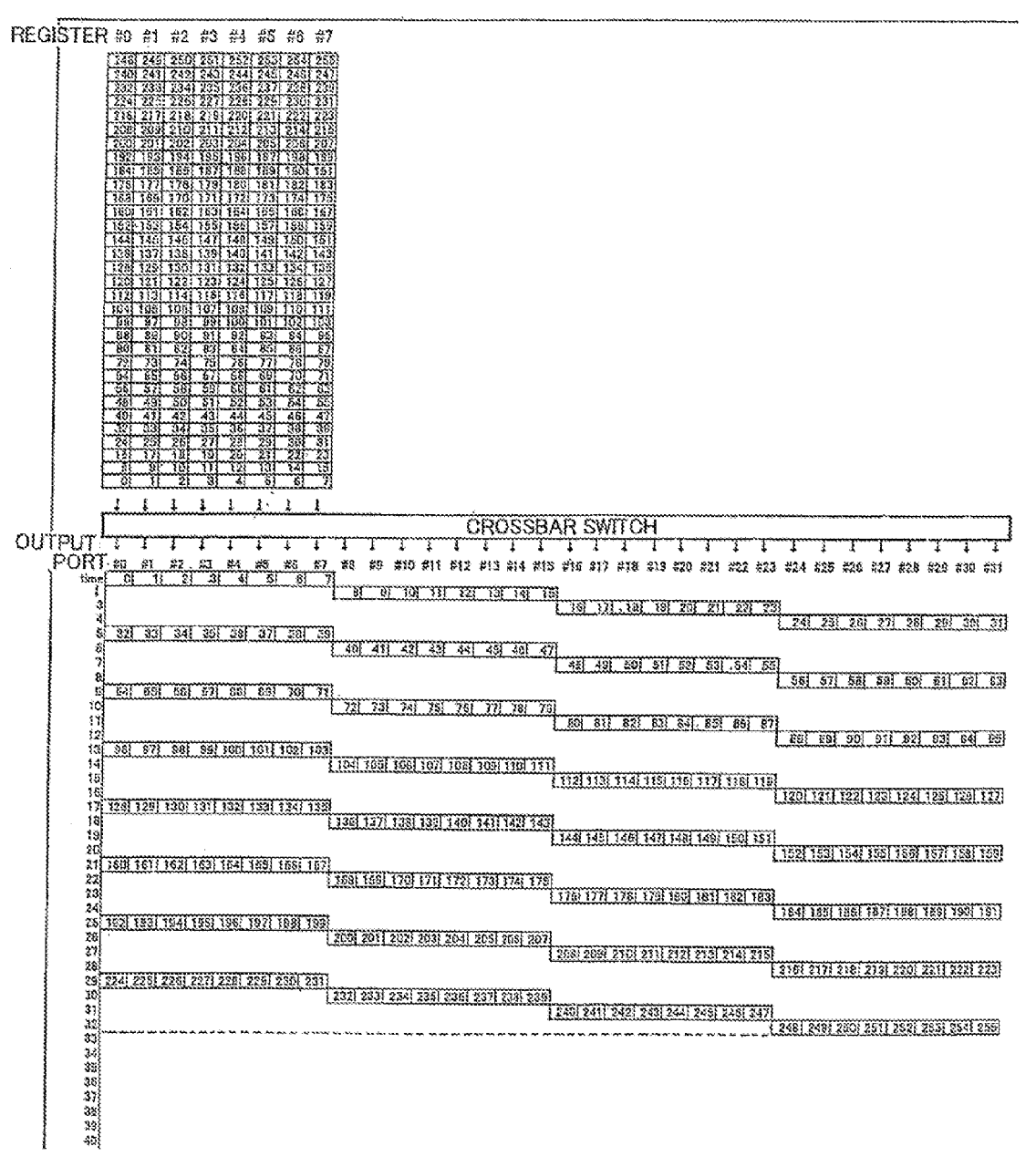

FIG. 3 shows a specific operation time chart.

The upper half of FIG. 3 shows the arrangement of the elements on the register. The lower half of FIG. 3 shows the numbers of the elements to be output at each time.

The elements 0 to 7 are output at the first machine clock, and the elements 8 to 15 are output at the next machine clock.

Since the pieces of data are transferred to respective different output ports element by element, no conflict occurs in the crossbar 110. As a result, it takes 32 machine clocks before all the elements are output.

According to the background art, when performing a vector store instruction, the vector pipelines can thus simultaneously output data and transfer the data through different CPU input/output ports to execute the vector store instruction with high throughput.

Patent Document 1: JP-A-2005-038185
Non-Patent Document 1: Sidney Fernbach, "Supercomputers" (translated by Shigeo Nagashima, 1988, Personal Media Corp.)

DISCLOSURE OF THE INVENTION

Problems to be Solved by the Invention

In the foregoing background art, the main memory device 106 is divided into banks as setting an element as a unit.

The multibank configuration as setting an element as a unit, however, is disadvantageous because of two reasons, and a multibank configuration as setting a plurality of elements as a unit is preferred in terms of performance and cost.

The first reason is that the main memory device is composed of RAMs that are suited to read data from consecutive addresses collectively.

The number of data bits to be read at a time has been on the increase with the improvement of the RAM operation speed.

Reading data from consecutive addresses collectively also has the advantage of lower power consumption as compared to the case of accessing different addresses a plurality of times.

The second reason consists in the efficiency when error-correction code is stored in the main memory device. An error-correction code is added for each unit of access to the main memory. The number of bits of the error-correction code will not vary much even if the access unit becomes greater.

Thus, the greater the access unit, the smaller the number of bits of the error-correction code can be made in total.

If the number of bits of the error-correction code necessary in constituting the same capacity of main memory device is reduced, it may be possible to construct the main memory device inexpensively.

From the foregoing two reasons, it is desirable that the main memory device is divided into banks as setting a plurality of elements as a unit.

The multibank configuration as setting a plurality of elements as a unit, however, causes a problem that the outputs from the respective vector pipelines can conflict at the CPU input/output ports, with a drop in the performance of the vector store.

Such a problem will be described with reference to FIGS. 4 and 5.

FIG. 4 shows a configuration example where the main memory device is divided into banks as setting a plurality of elements as a unit according to the background art.

A difference from FIG. 1 consists a unit of storage of data in the main memory data storing sections.

In the present example, the banks are divided as setting eight elements as a unit. That is, the elements 0 to 7 are stored in the main memory data storing section 108-0, and the elements 8 to 15 are stored in the main memory data storing section 108-1.

When a vector store instruction on consecutive addresses is issued, the vector pipelines 109 sequentially output data from the register banks.

The address calculating section 104 collectively calculates main memory addresses for the respective pieces of output data from the vector pipelines 109.

Figure 5:
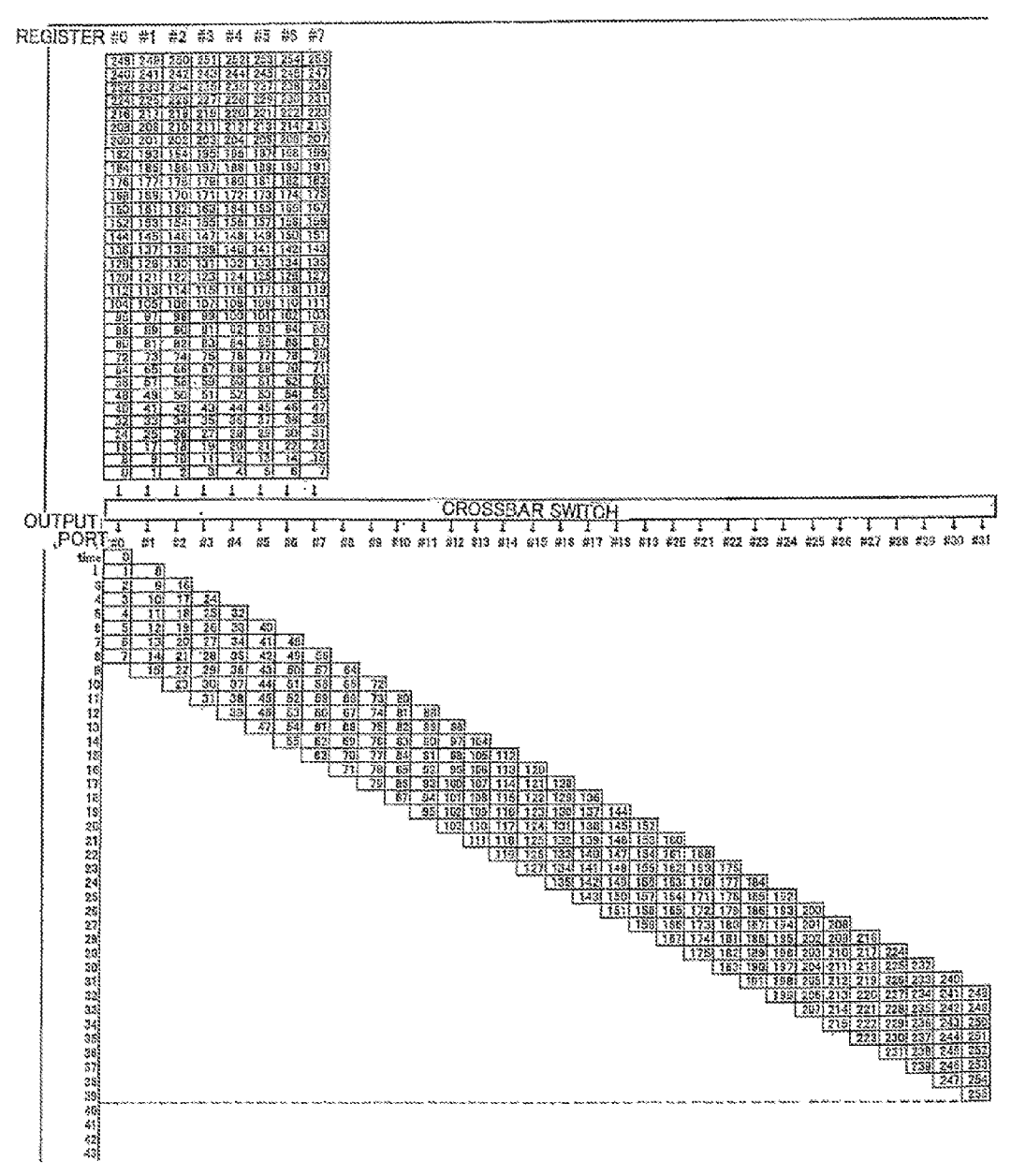

FIG. 5 shows a specific operation time chart.

The upper half of FIG. 5 shows the arrangement of the elements on the register. The lower half of FIG. 5 shows the numbers of the elements to be output at each time.

At the first machine clock, the elements 0 to 7 are input to the crossbar. All the pieces of data are to be transferred to the main memory data storing section 108-0.

As a result, a conflict occurs at the leftmost output port of the crossbar 110, and elements that lose in the conflict arbitration wait at the respective input ports of the crossbar 110.

Suppose that the conflict arbitration always gives priority to lower port numbers.

It follows that the element 0 is output at the first machine clock while the seven elements 1 to 7 wait at the respective input ports of the crossbar 110.

At the next machine clock, the register bank 112-0 outputs the element 8. The other resister banks 112-1 to 112-7 are not allowed to output next elements, however, since the elements output at the previous machine clock are still at the input ports of the crossbar 110.

The conflict arbitration in the crossbar 110 involves eight elements, including the element 8 from the register bank 112-0, the element 1 from the register bank 112-1, and the element 2 from the register bank 112-2.

Of these, the element 8 is a piece of data to be stored in the main memory data storing section 108-1, and the other seven elements are pieces of data to be stored in the main memory data storing section 118-0.

The element 8 is output without conflict. Among the seven elements 1 to 7, the element 1 is output as a result of conflict arbitration.

Since the pieces of data that are initially output collide at the output port as described above, the register banks that lose in the conflict arbitration cause delays in output.

Consequently, it takes thirty-nine machine clocks before the final element (in this explanation, the element 255) is output.

As described above, if the main memory is divided into banks as setting a plurality of elements as a unit, there can occur the problem that pieces of data to be output collide at the main memory (at the CPU input/output ports 105 connected thereto in a one-to-one relationship) and a drop in the throughput of the vector store occurs.

It will be understood that such a problem can be solved by increasing the CPU input/output ports and the crossbar in data width. The increased data width, however, has a significant impact on the area of the LSI.

It is an object of the present invention to speed up a vector store instruction on a memory that is divided into banks as setting a plurality of elements as a unit while minimizing an increase in physical quantity.

Means for Solving the Problems

As means for solving the problems, according to the present invention, there is provided a vector processing apparatus comprising a plurality of register banks into which a vector register is divided, the apparatus processing a data string including a plurality of data elements retained in the plurality of register banks, wherein:

each of the plurality of register banks each has a read pointer that points to a read position for reading the data elements; and a start position of the read pointer is changed at every register bank.

Advantages of the Invention

According to the present invention, it is possible to avoid a conflict at the output ports during vector store processing and prevent the execution time of the vector store processing from increasing even if a memory divided into banks as setting a plurality of elements as a unit is connected.

BRIEF DESCRIPTION OF THE DRAWINGS

FIG. 3 is a time chart of a main memory device according to the background art.

FIG. 5 is a time chart of a main memory device according to the background art.

FIG. 8 is a time chart of a main memory device according to the first embodiment of the present invention.

EXPLANATION OF REFERENCE SYMBOLS

Figure 1:
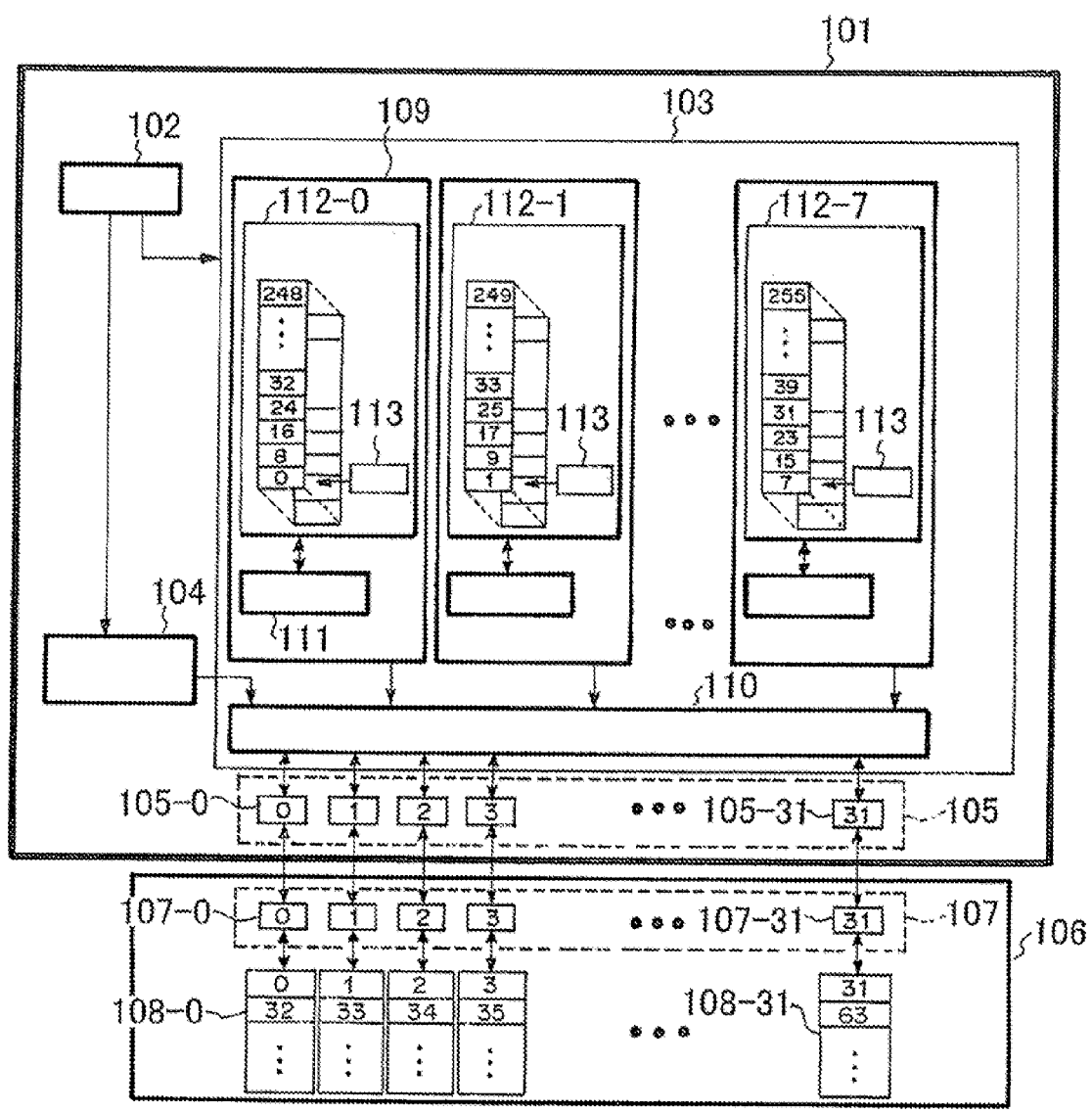
FIG. 1 is a block diagram showing a configuration example of a vector processor of the background art.
Figure 2:
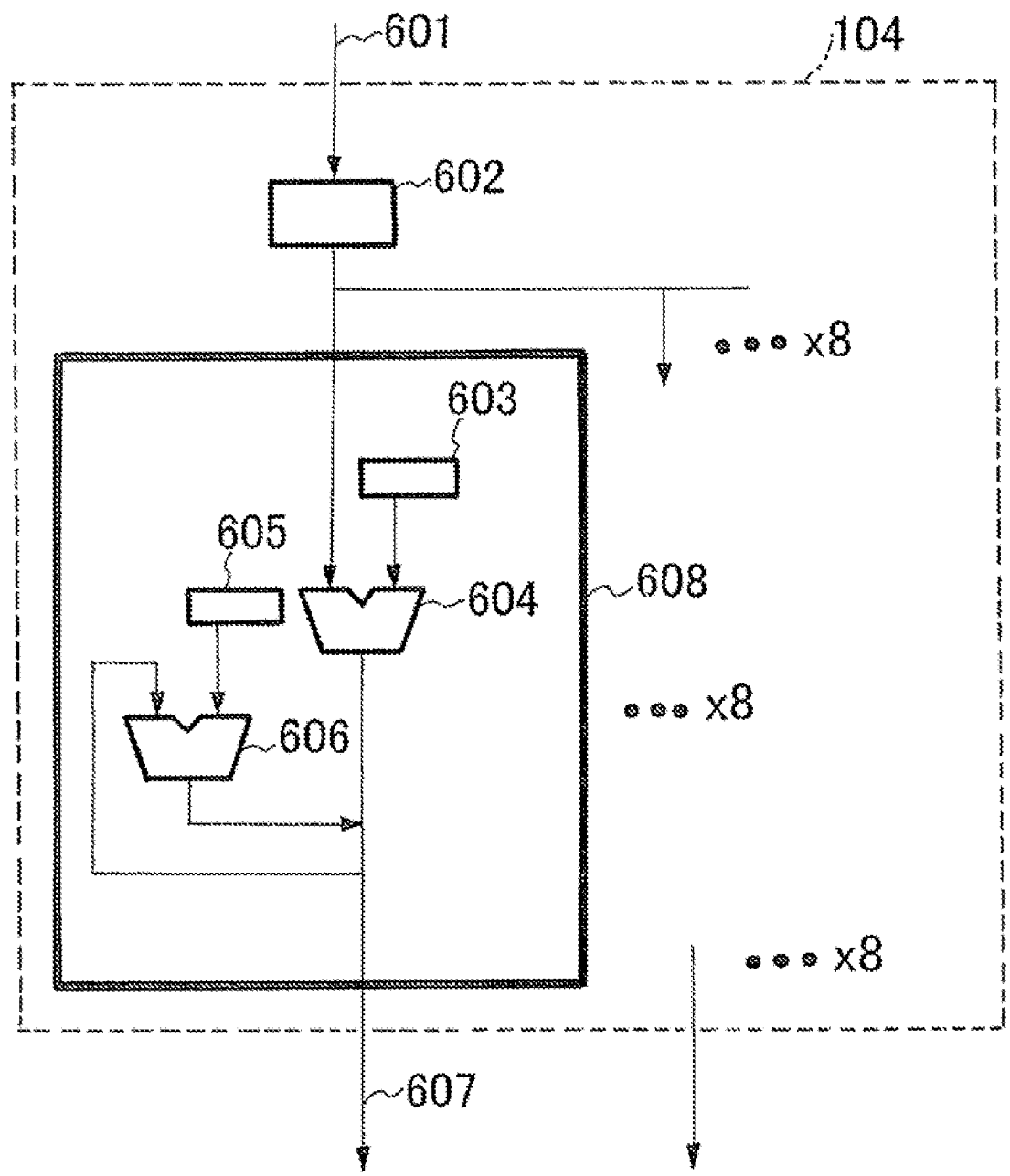
FIG. 2 is a block diagram showing a configuration example of an address calculating section of the background art.

101: central processing unit
102: instruction issuance control section
103: vector processing section
104: address calculating section
105: CPU input/output port
106: main memory device
107: main memory input/output port
108: main memory data storing section
109: vector pipeline
110: crossbar
111: vector arithmetic section
112-0 to 112-7: register bank
113: read pointer
114: VL retaining section
115: start position retaining section
201: signal line
202: read pointer signal line
203: start address retaining section
204: pipe number retaining section
205: offset calculating circuit
206: adder
207: address signal line
208: address calculating circuit 401: signal line
402: start address retaining section
403: start position offset retaining section
404: adder
405: address retaining section
406: offset retaining section
407: adder
408: end address retaining section
409: comparator
410: start address retaining section
411: register
412: address signal line
413: address calculating circuit
601: signal line
602: start address retaining section
603: pipeline offset
604: adder
605: offset
606: adder
607: address signal line
608: address calculating circuit

BEST MODE FOR CARRYING OUT THE INVENTION

Hereinafter, best mode for carrying out the present invention will be described with reference to the accompanying drawings.

It should be noted that the technologies disclosed by the present invention are not limited to a vector processor but are applicable to any information processing apparatus that has a plurality of arithmetic pipelines and simultaneously transfers data retained in the arithmetic pipelines to a main memory of multibank configuration. Hereinafter, exemplary embodiments will be described in the context of a vector processor.

First Embodiment

[Description of Configuration]

Figure 6:
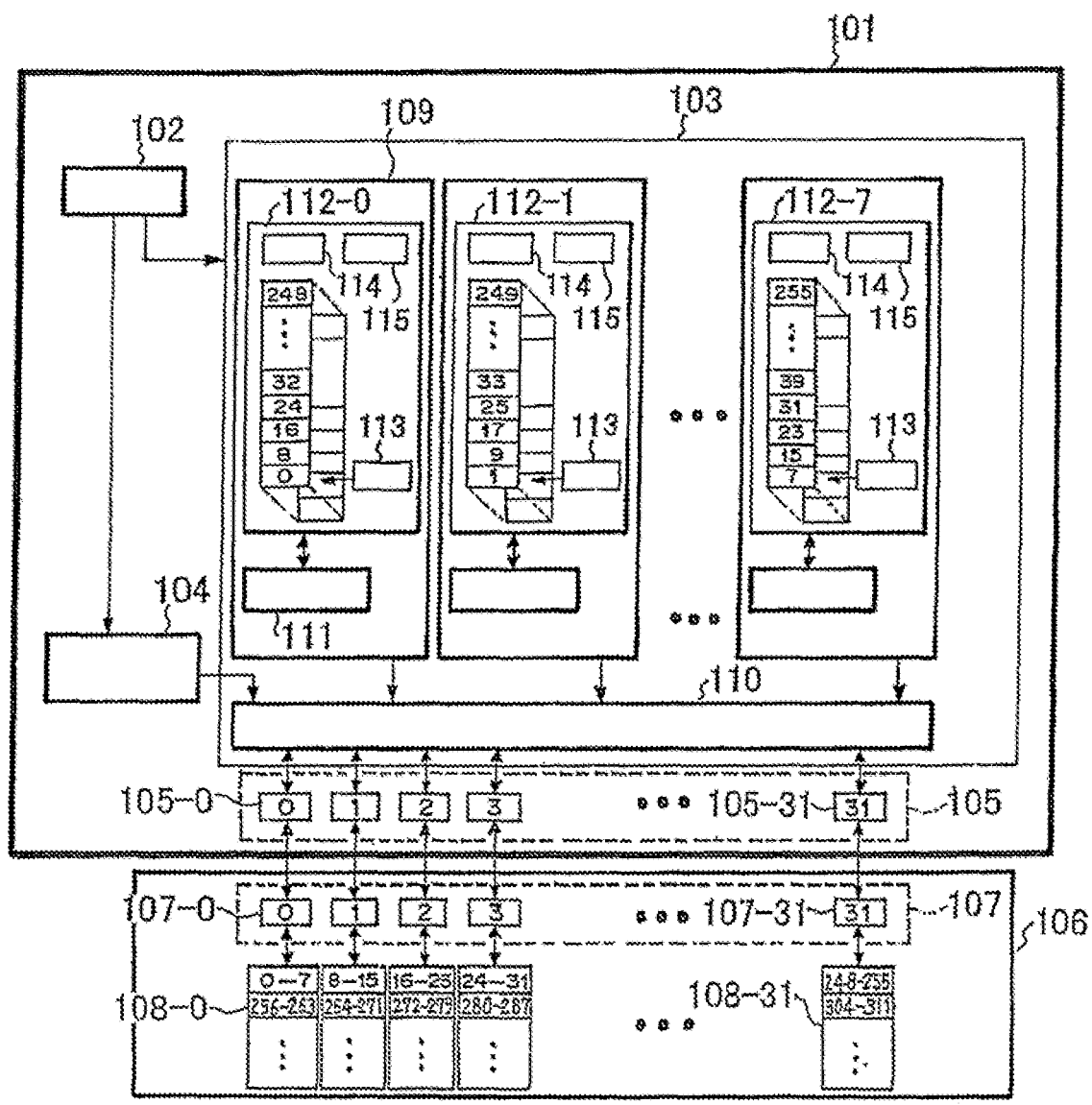
FIG. 6 is a block diagram showing a configuration example of a vector processor which is a first embodiment of the present invention.

FIG. 6 is a block diagram showing a configuration example of a vector processor which is a first embodiment of the present invention.

Figure 4:
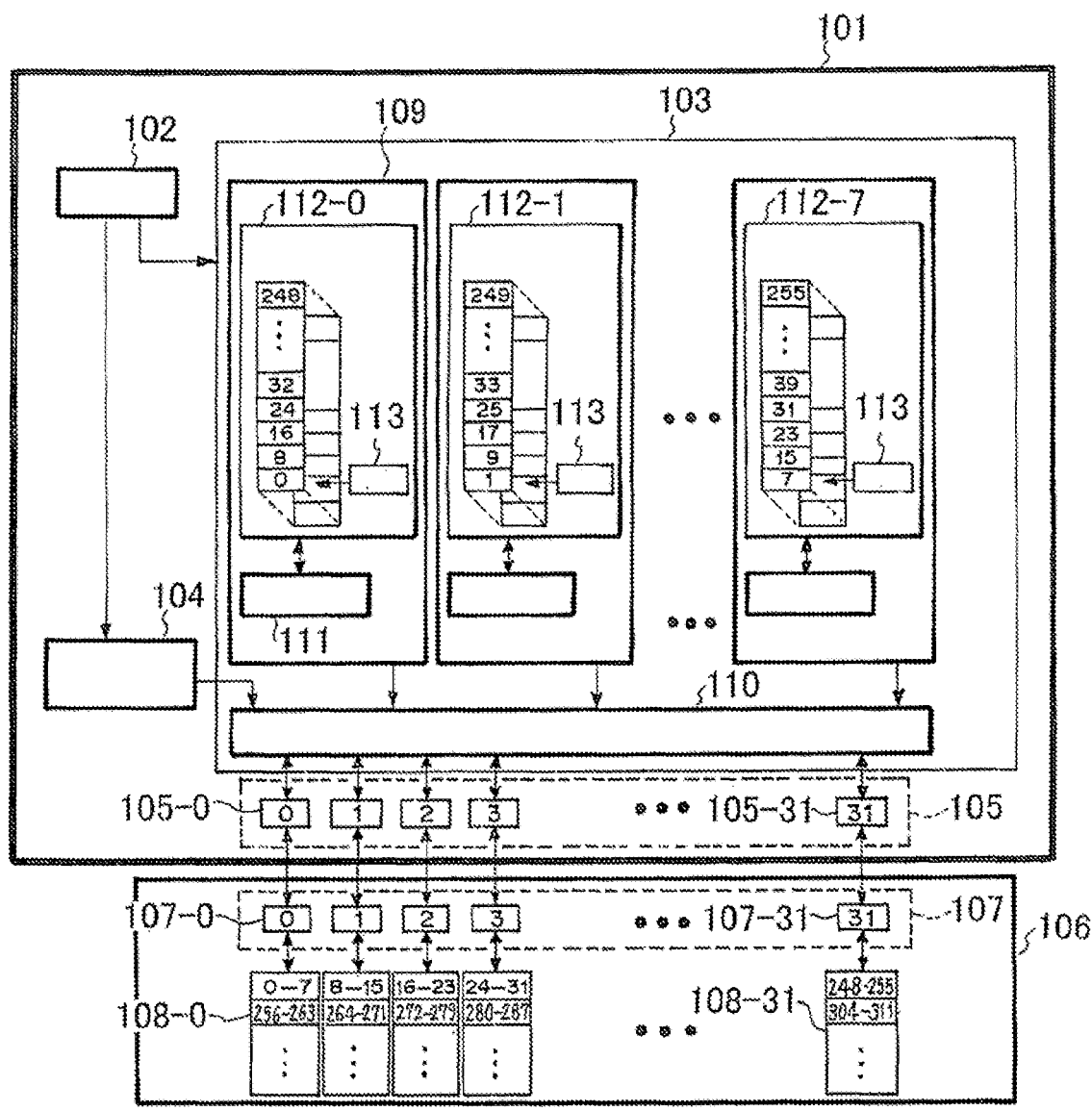
FIG. 4 is a block diagram showing a configuration example of a vector processor of the background art.

A difference from FIG. 4 of the background art consists in the register banks 112-0 to 112-7 and the address calculating section 104.

The register banks 112-0 to 112-7 have a VL (Vector Length) retaining section 114 and a start position retaining section 115 each.

The VL retaining sections 114 indicate the numbers of effective elements on the register banks 112-n (here, "n" is one of numbers from 0 to 7).

Such values are retained for the respective vector pipelines 109.

Instead of the values being retained for the respective vector pipelines 109, the vector length in the entire vector processing section may be retained to calculate the values of the respective pipelines each time.

The start point retaining sections 115 contain the numbers of the respective register banks (which are also the numbers of the pipelines 109).

That is, the start point retaining section 115 of the register bank 112-0 contains "0", the start position retaining section 115 of the register bank 112-1 contains "1", and so on.

Figure 7:
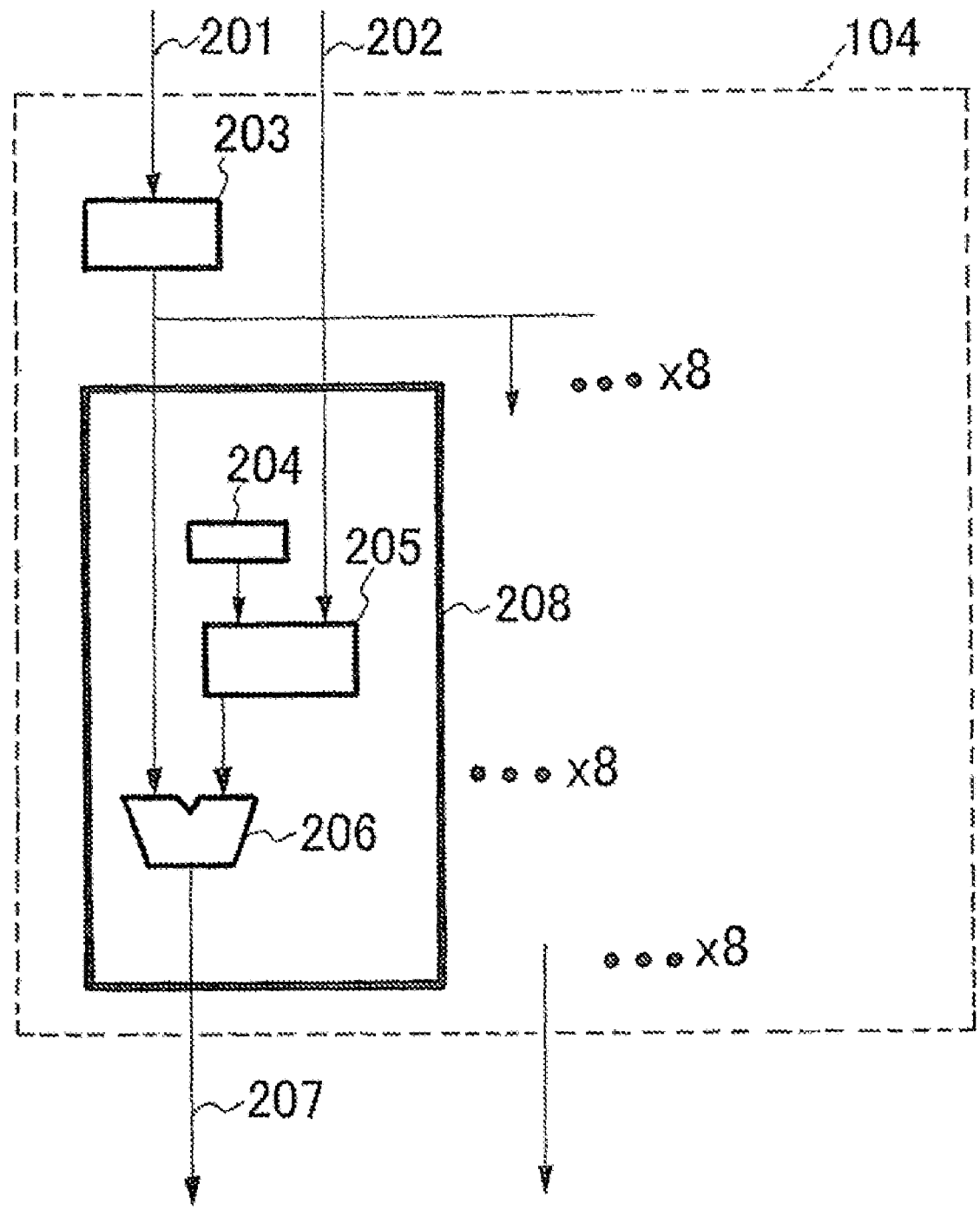
FIG. 7 is a block diagram showing a configuration example of an address calculating section 104 according to the first embodiment of the present invention.

FIG. 7 is a block diagram showing a configuration example of the address calculating section 104 according to the present embodiment.

A signal line 201 is a signal line for receiving a start address from an instruction issuance control section 102. A start address retaining section 203 is a register that retains the received value.

A signal line 202 is a signal line for receiving the value of a read pointer 113 from each register bank 112-n.

A pipe number retaining section 204 contains the number of the corresponding vector pipeline 109.

An offset calculating circuit 205 is a circuit that calculates an address offset value from the value of the pipe number retaining section 204, and the stride value (not shown) of the vector store instruction passed from the read pointer 113 and the instruction issuance control section 102.

Specifically, the address offset value is obtained by calculating (the number of pipes×the read pointer+the pipe number)×the stride value.

An adder 206 calculates the address value of the element output by each vector pipeline 109 from the start address and the address offset value, and passes the address value to a crossbar 110 through an address signal line 207.

The address calculating section 104 receives the values of the read pointers 113 from the register banks 112-n at each machine clock, and calculates new address values based on the received values and outputs the new address values to the crossbar 110.

Address calculating circuits 208 are provided for the respective vector pipelines 109, and can thus calculate the addresses of eight elements in each single machine clock.

[Description of Operation]

Description will initially be given of the operation of the vector register in vector store processing.

When issuing a vector store instruction, the instruction issuance control section 102 checks whether or not the addresses of the elements under the same instruction overlap each other (pieces of data are recorded without overlap if the vector store instruction has a stride value greater than or equal to the data length of each element). If there is no overlap, the instruction issuance control section 102 sets the values of the start position retaining sections 115 as the initial values of the read pointers 113.

If there is any overlap, elements are read as usual from the top since it is necessary to ensure writing in order of elements on the register banks.

The contents of the read pointers 113 are increased at each reading, and are reset (corrected) to "0" (which indicates the top elements of the register banks) if the contents exceed the values of the final elements stored in the VL retaining sections.

As described above, the read pointers 113 are controlled to read data from respective different locations on the register banks 112-n during vector store processing.

Next, the overall operation will be described with reference to FIG. 8.

Figure 8:
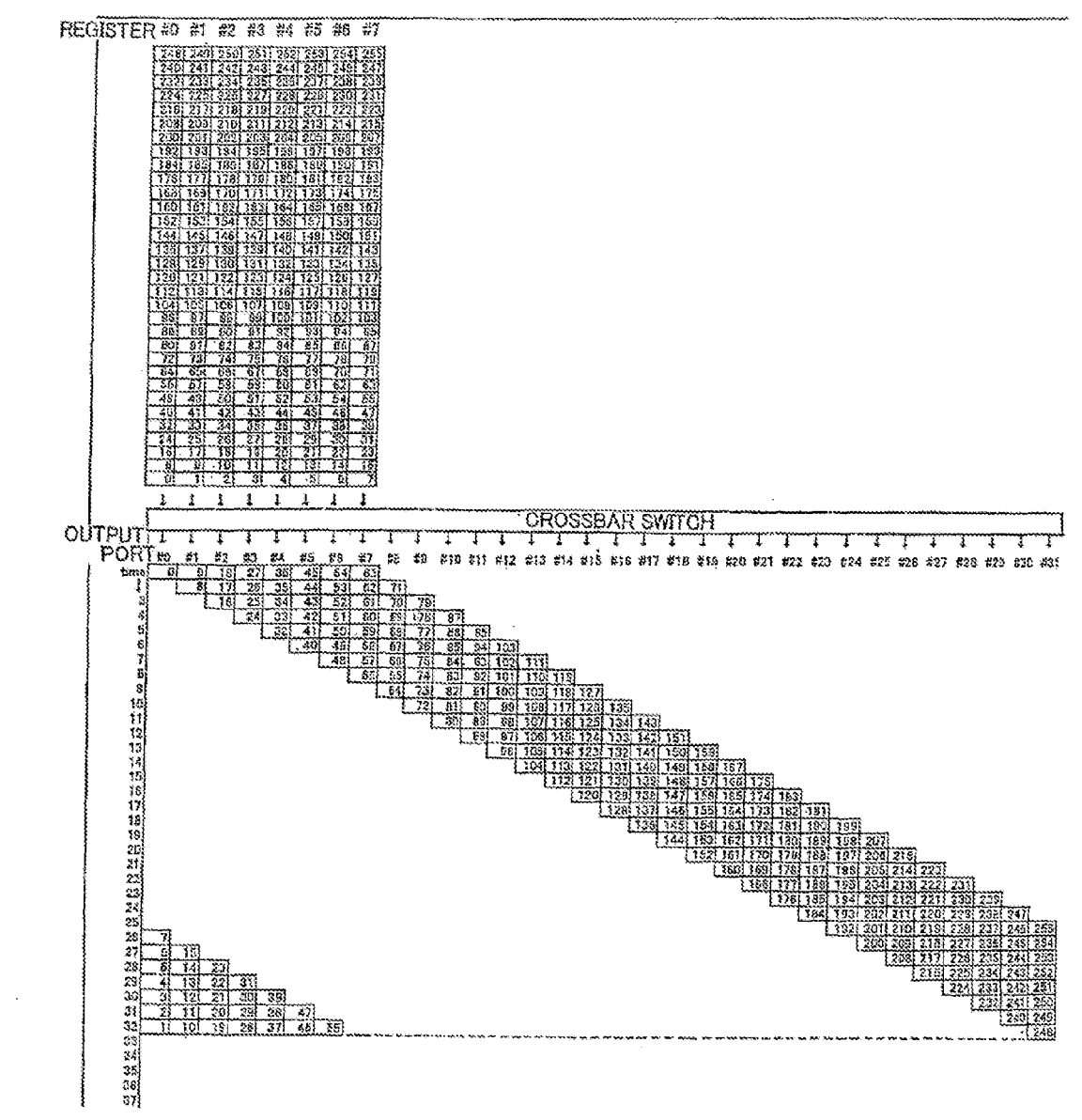

The upper half of FIG. 8 shows the arrangement of the elements on the register. The lower half of FIG. 8 shows the numbers of the elements to be output at each time.

At the first machine clock, reading is started with a state that the read pointers 113 of the respective register banks 112-n are shifted, like the element 0 from the register bank 112-0, the element 9 from the register bank 112-1, the element 18 from the register bank 112-2, and so on.

The element 0 is a piece of data to be stored in the main memory data storing section 108-0, and the element 9 a piece of data to be stored in the main memory data storing section 108-1.

The same holds for the following, so that the pieces of data output from the respective register banks 112-n (here, "n" is one of numbers from 0 to 7) are not stored in a single main memory data storing section but in respective different main memory data storing sections 108-*n*. Consequently, the crossbar 110 can transfer all the input data to the output ports without conflict.

At the next machine clock, the read pointers 113 of the respective register banks 112-*n* are shifted by one each, and the pieces of data that the read pointers 113 point to are output, like the element 8 from the register bank 112-0, the element 17 from the register bank 112-1, and so on.

Again, all the pieces of data output at an identical machine clock are stored in respective different main memory data storing sections 108-*n*, so that no conflict occurs in the crossbar 110.

As described above, the pieces of data output at the same'time will not collide at the output ports. The crossbar 110 therefore performs no conflict arbitration, and the output of the final element (in the present example, the element 255) finishes by the 32nd machine clock.

The absence of collision at the crossbar 110 translates into no drop in the throughput of the vector store.

Second Embodiment

[Description of Configuration]

Description will now be given of a vector processing apparatus which is a second embodiment of the present invention.

Figure 9:
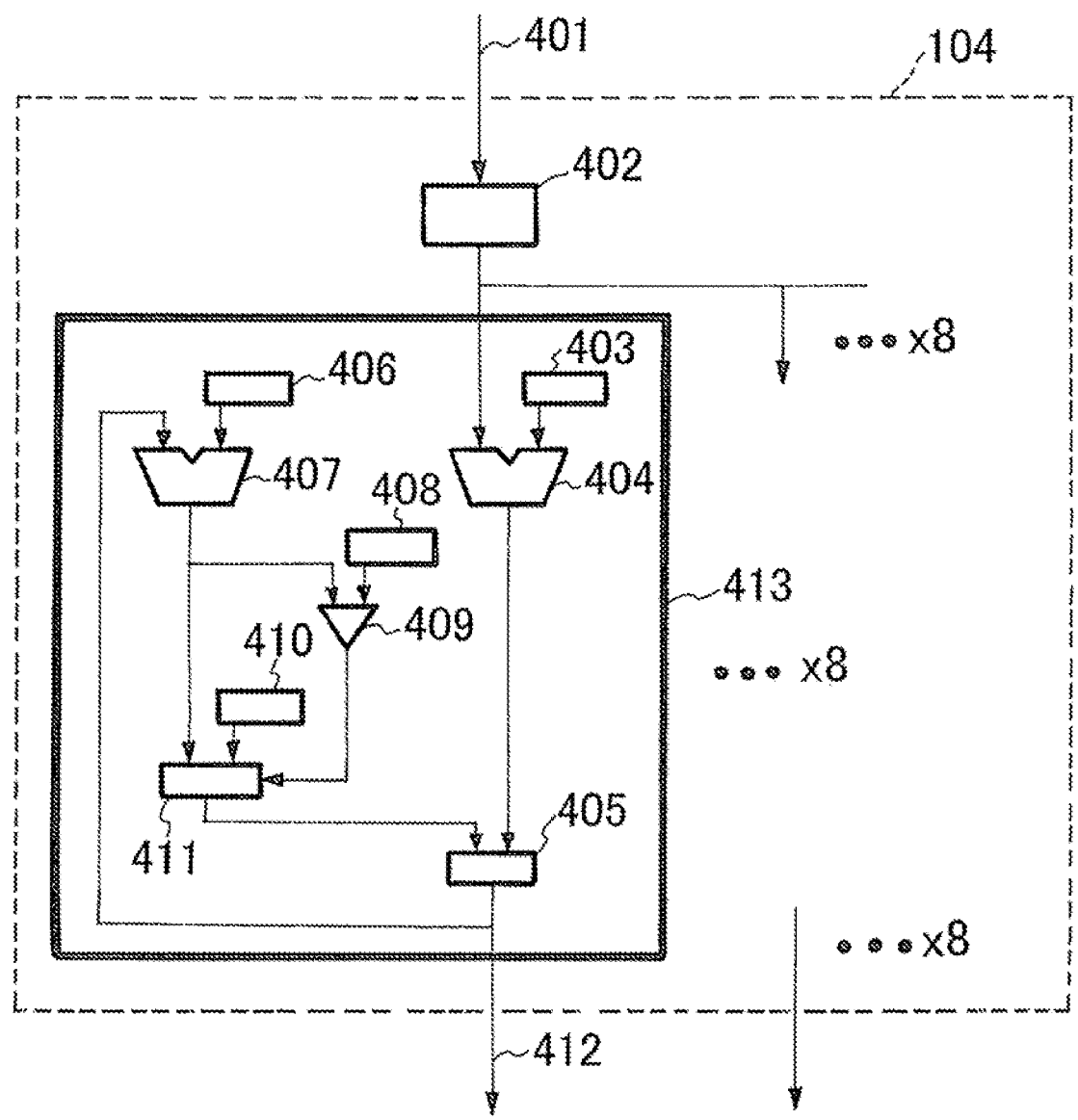
FIG. 9 is a block diagram showing a configuration example of the address calculating section 104 according to a second embodiment of the present invention.

The vector processing apparatus of the present embodiment differs from the first embodiment only in the configuration of the address calculating section. FIG. 9 shows a configuration example of the address calculating section according to the present embodiment.

A signal line 401 is a signal line for receiving a start address from the instruction issuance control section 102. A start address retaining section 402 is a register that retains the value received.

A start position offset retaining section 403 retains an offset value for calculating the address value of a first piece of data to be read, the offset value being calculated from a pipe number and the stride value of the vector store instruction.

At the start of a vector store, the start address and the value of the start position offset retaining section 403 are added by an adder 404. The address value of the piece of data to be firstly read in each vector pipe is stored in the address retaining section 405.

The value of the address retaining section 405 is passed to the crossbar 110 through an address signal line 412.

An adder 407 adds the value of a stride retaining section 406 to the value of the address retaining section 405.

The value of the offset retaining section 406 is determined by the stride value of the vector store instruction and the number of vector pipelines 109.

An end address retaining section 408 calculates an address corresponding to the last piece of data from the number of effective elements in the corresponding vector register, and retains the result.

A start address retaining section 410 calculates an address corresponding to the top piece of data of the vector register, and retains the result.

The result of the adder 407 is compared with the end address retaining section 408, and if coincident, a control is carried out so that the data of the start address regaining section 410 is written to a register 411 at the next machine cycle.

If not, the output result of the adder 407 is written to the register 411.

The register 411 overwrites the data of the address retaining section 405 at the next machine cycle. Such a procedure is performed at each machine cycle.

[Description of Operation]

The operation of the second embodiment of the present invention is the same as that of the first embodiment.

Up to this point, representative exemplary embodiments of the present invention have been described. However, the present invention may be carried out in various other forms without departing from the spirit or essential characteristics set forth by the appended claims of the invention. The foregoing embodiments are therefore to be considered as mere illustrative and not restrictive. The scope of the invention shall be indicated by the claims rather than by the description of the specification or abstract. All changes and modifications which come within the meaning and range of equivalency of the claims are intended to be embraced within the scope of the present invention.

INDUSTRIAL APPLICABILITY

The present invention is applicable to a vector processing apparatus and more particularly, to a vector processing apparatus that has a vector register of multibank configuration.

The invention claimed is:

1. A vector processing apparatus comprising:
a plurality of register banks into which a vector register is divided, each of the plurality of register banks retaining a plurality of data elements; and
a plurality of arithmetic units that perform multiple parallel operations corresponding to the plurality of register banks, the plurality of arithmetic units being connected with the respective plurality of register banks to process a data string including the plurality of data elements, each element of the data string being processed in each successive cycle, wherein
each of the plurality of register banks each has a read pointer that points to one of the plurality of data elements in each successive cycle, corresponding to a vector register specified by an instruction word, and a start position of the read pointer for processing an element of the data string in a first cycle is different at every register bank.

2. The vector processing apparatus according to claim 1, wherein consecutive numbers assigned to the register banks are used as read start positions of the read pointers.

3. The vector processing apparatus according to claim 1, comprising,
for each of the register banks, a vector length retaining section that retains a value indicating the number of effective elements, and wherein
a value indicating the read position of the read pointer is increased upon each read of the data elements, and the value indicating the read position is corrected to a top element of the register bank if the value indicating the read position goes out of the range of the number of effective elements retained in the vector length retaining section.

4. The vector processing apparatus according to claim 1, wherein the start position of the read pointer is changed if write addresses of intended data elements in the vector register do not overlap each other when executing a vector store instruction.

5. The vector processing apparatus according to claim 1, comprising an address calculating circuit that collectively calculates addresses corresponding to output values of the respective register banks in an identical machine clock, and wherein the address calculating circuit receives the values indicating the read positions of the read pointers of the respective register banks to calculate the addresses.

6. The vector processing apparatus according to claim 3, comprising an address calculating circuit that collectively calculates addresses corresponding to output values of the respective register banks in an identical machine clock, and wherein:

the address calculating circuit retains a start address and an end address corresponding to data of each of the respective register banks; and if the value indicating the read position of the read pointer of the register bank goes out of the range of the number of effective elements and the value indicating the read position of the read pointer is corrected to the top element of the register bank, an address value to be output is corrected by using the value of the start address.

7. The vector processing apparatus according to claim 1, comprising a main memory device that stores a group of data elements output from the plurality of register banks, and wherein:

the plurality of register banks output respective data elements at an identical machine cycle; and the main memory device stores the group of data elements output at the identical machine cycle into a data storing section as a single data unit.

* * * * *